(12) United States Patent
Takahashi et al.

(10) Patent No.: US 10,818,888 B2
(45) Date of Patent: Oct. 27, 2020

(54) BATTERY UNIT HAVING COMBUSTION RESISTANCE

(71) Applicant: HONDA MOTOR CO., LTD., Tokyo (JP)

(72) Inventors: Masaki Takahashi, Saitama (JP); Kengo Aoki, Saitama (JP); Ryo Fujii, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 189 days.

(21) Appl. No.: 16/123,065

(22) Filed: Sep. 6, 2018

(65) Prior Publication Data
US 2019/0097187 A1 Mar. 28, 2019

(30) Foreign Application Priority Data

Sep. 27, 2017 (JP) .................. 2017-186830

(51) Int. Cl.
*H01M 2/04* (2006.01)
*H01M 2/10* (2006.01)

(52) U.S. Cl.
CPC ....... *H01M 2/0456* (2013.01); *H01M 2/1072* (2013.01); *H01M 2/1083* (2013.01); *H01M 2220/20* (2013.01)

(58) Field of Classification Search
CPC ........... H01M 2250/20; H01M 2/0456; H01M 2/029; H01M 2/1094; H01M 2/0491; H01M 2/0482; B60R 1/04; B60K 1/04; B60L 50/66; B60L 50/64; B60L 50/50
See application file for complete search history.

(56) References Cited

U.S. PATENT DOCUMENTS

2015/0285426 A1* 10/2015 Shaw ................ B32B 15/20
428/34.5
2017/0267089 A1* 9/2017 Koyama ............ B60K 1/04

FOREIGN PATENT DOCUMENTS

JP 2015-530282 A 10/2015
WO WO 2014/013216 A1 1/2014

* cited by examiner

*Primary Examiner* — Barbara L Gilliam
*Assistant Examiner* — George Kim
(74) *Attorney, Agent, or Firm* — Paratus Law Group, PLLC

(57) ABSTRACT

A battery unit includes a battery, and a case accommodating the battery. The case includes: a case body including: a bottom portion; and a side wall, which is erected from the bottom portion and defines an opening portion; and a lid covering the opening portion of the case body. The case body and the lid are fastened at flange portions thereof. The flange portion of the case body, the flange portion of the lid, and the case body are covered with an incombustible member containing a glass material.

6 Claims, 7 Drawing Sheets

BATTERY UNIT HAVING COMBUSTION RESISTANCE

CROSS-REFERENCE TO RELATED APPLICATION(S)

This application claims priority from Japanese Patent Application No. 2017-186830 filed on Sep. 27, 2017, the entire contents of which are incorporated herein by reference.

FIELD

The present invention relates to a battery unit mounted on a vehicle.

BACKGROUND

In vehicles such as a Hybrid Electrical Vehicle (HEV) and an Electrical Vehicle (EV), a battery unit accommodating a battery is mounted. In a battery unit of this type, countermeasures against combustion capable of avoiding combustion may be required even when fire reaches the surroundings thereof in the event of a vehicle fire or the like.

A battery unit adopting a case structure made of a metal material is known as a battery unit with such countermeasures against combustion. In addition, JP-T-2015-530282 discloses that a battery unit is covered with a fire resistant sheet to enhance combustion resistance performance.

However, when the entirety of a battery unit is covered with a fire resistant sheet, since a harness connecting the battery unit and other electric devices, a cooling duct, and the like penetrate the sheet, it is not preferable.

SUMMARY

The invention provides a technology for improving combustion resistance performance in a battery unit.

According to an aspect of the invention, there is provided a battery unit including a battery, and a case accommodating the battery, wherein the case includes:
a case body including:
a bottom portion; and
a side wall, which is erected from the bottom portion and defines an opening portion; and
a lid covering the opening portion of the case body,
the case body and the lid are fastened at flange portions thereof, and
the flange portion of the case body, the flange portion of the lid, and the case body are covered with an incombustible member containing a glass material.

According to the aspect described above, the flange portion of the case body, the flange portion of the lid, and the case body constituting the case are covered with an incombustible member containing a glass material, and thus combustion of the case body can be prevented regardless of a material forming the case body.

DETAILED DESCRIPTION

Figure 1:
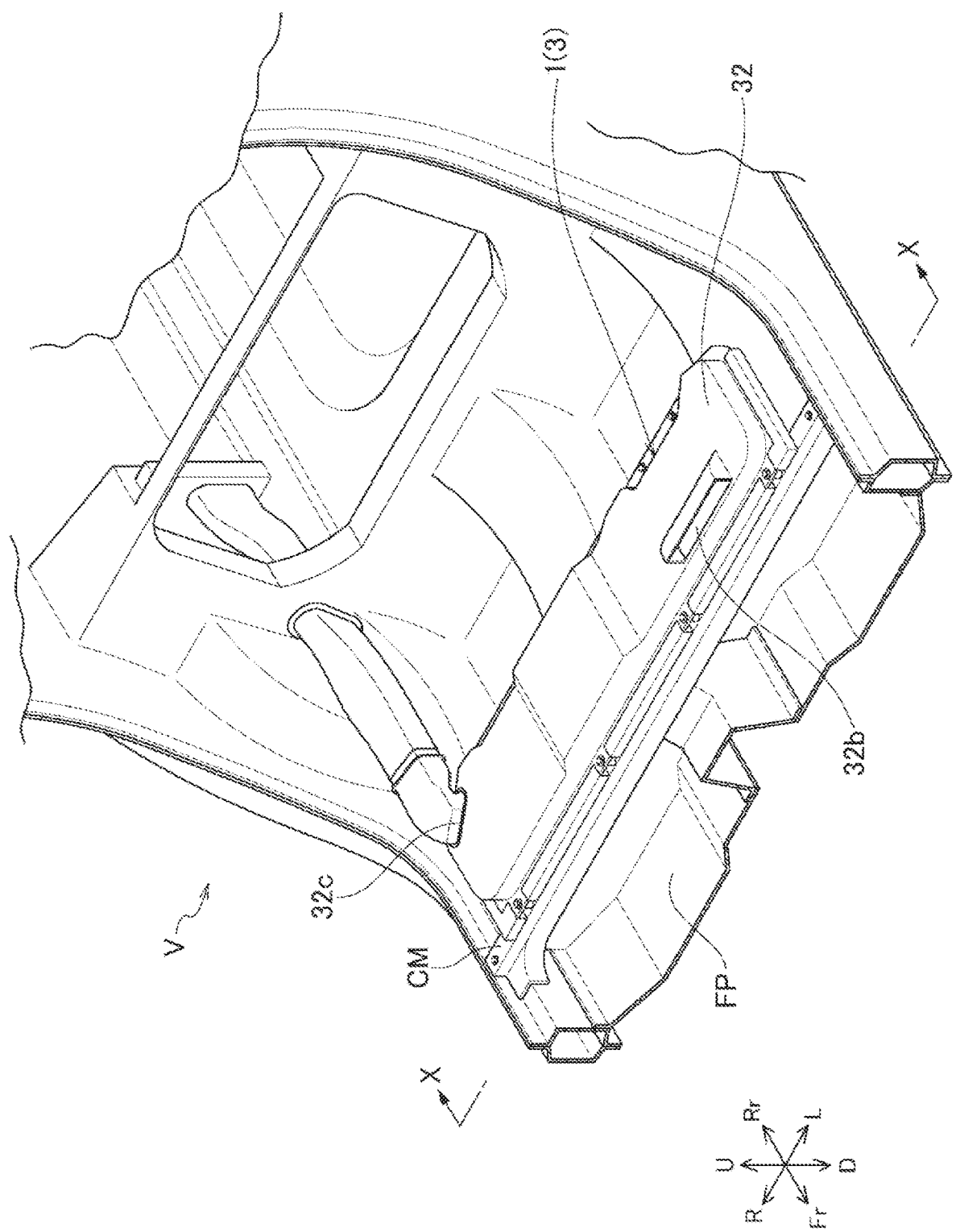
FIG. 1 is a perspective view illustrating a part of a vehicle on which a battery unit according to an embodiment of the invention is mounted and is a perspective view of a floor panel and the battery unit of the vehicle as seen obliquely from the front forward.

Hereinafter, an embodiment of the invention will be described with reference to the drawings. In the drawings, the front of a vehicle is denoted by Fr, the rear is denoted by Rr, the left is denoted by L, the right is denoted by R, the upper is denoted by U, and the lower is denoted by D, according to directions viewed from a driver.

[Battery Unit]

Figure 2:
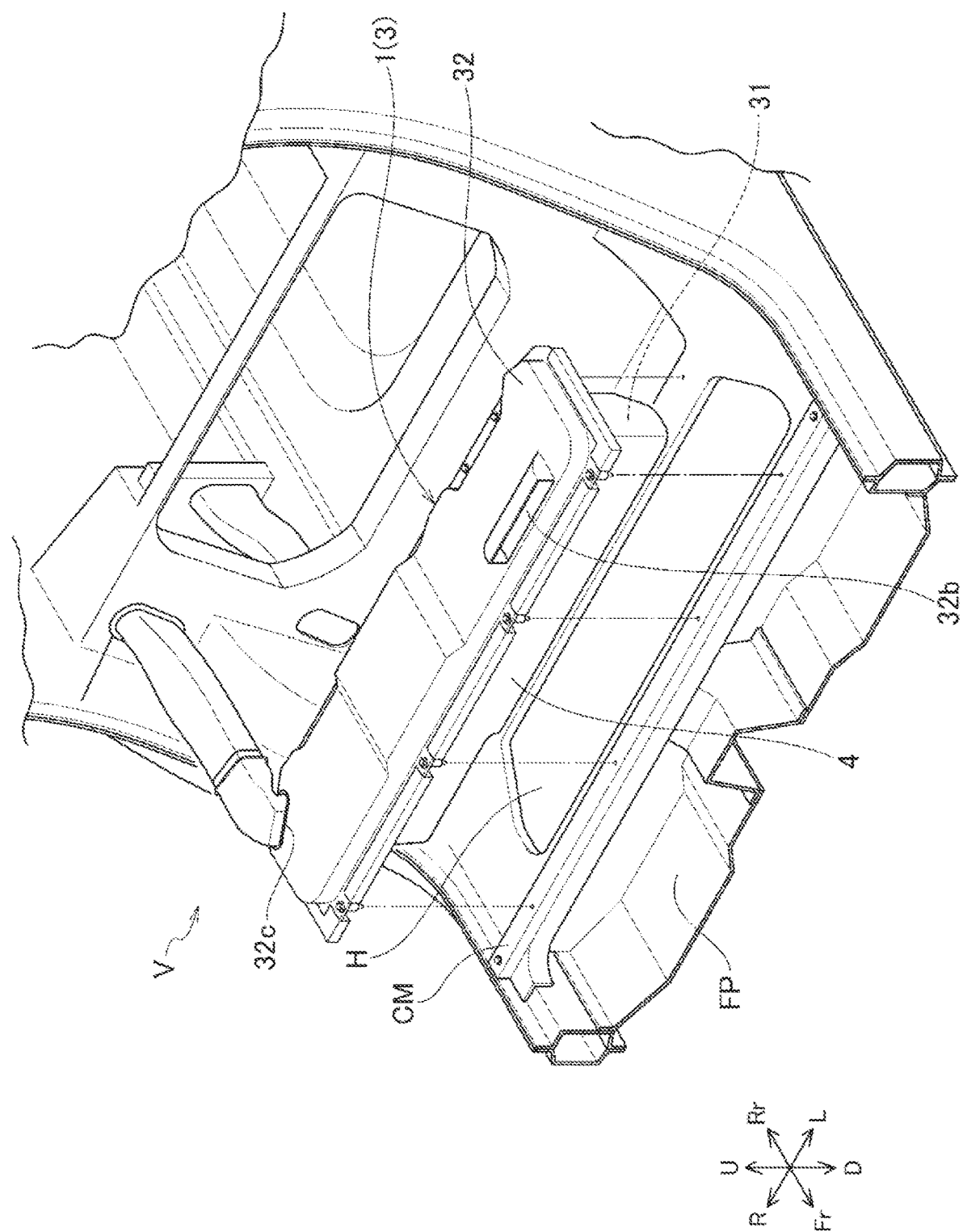
FIG. 2 is an exploded perspective view of the battery unit suspended from the floor panel of and a battery unit accommodation portion of the vehicle as seen obliquely from the front forward.
Figure 3:
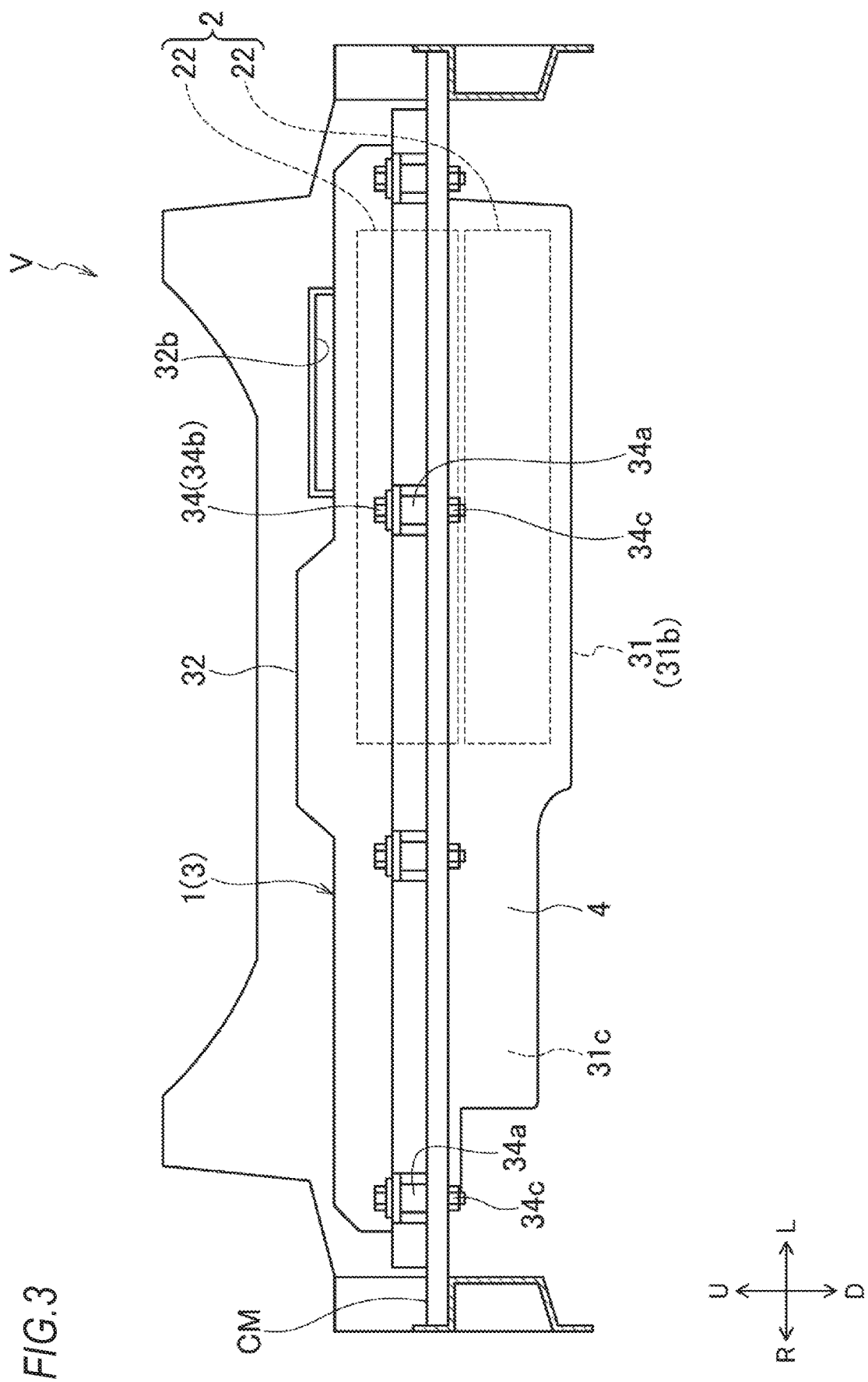
FIG. 3 is a cross-sectional view taken along line X-X in FIG. 1.

As illustrated in FIGS. 1 to 3, a battery unit 1 according to the embodiment of the invention is mounted on a vehicle V such as an HEV, an EV, or the like. The vehicle V includes a battery unit accommodation portion H in a floor panel FP, and the battery unit 1 is accommodated in the battery unit accommodation portion H to be fastened to a vehicle skeleton member CM. The vehicle skeleton member CM is, for example, a cross member bridged between a left side sill and the right side sill.

The battery unit 1 includes a battery 2, a cooling system component for cooling the battery 2, a control system component for controlling the battery 2, a case 3 for accommodating those components, and an incombustible member 4 which is a combustion countermeasure component for preventing combustion of the case 3. The cooling system component and the control system component are not a main part of the invention, and thus the explanation thereof will be omitted.

[Battery]

The battery 2 includes a battery module 22 constituted of a plurality of cells stacked in a vehicle width direction. Although the battery 2 of the embodiment includes two battery modules 22 arranged in two upper and lower stages, the number of the battery modules 22 and the number of cells can be appropriately changed.

[Case]

As illustrated in FIGS. 1 to 7, the case 3 includes a case body 31 which accommodates the battery 2 and the like and a lid 32 which covers an opening portion (not illustrated) of the case body 31, and the case body 31 and the lid 32 are formed of resin for weight reduction. The case body 31 and the lid 32 are not limited to resin and may be formed of metal. It is possible to reduce the weight of case 3 by forming the case body 31 and the lid 32 with a resin which is light in weight compared to a metal or the like. However, countermeasures against combustion of the case body 31 are required, as described below.

The case body 31 includes a bottom portion 31*b*, front, rear, left, and right side walls 31*c* erected from the bottom portion 31*b* and defining an opening portion, and a flange portion 31*a* extending outward from a peripheral edge portion of the opening portion.

The lid 32 includes a flange portion 32*a* extending outward from an outer peripheral edge portion, an air intake hole 32b for sucking cooling air into the battery unit 1 from a cabin, and an exhaust hole 32c for discharging the cooling air which cooled the battery 2 to the outside (cargo space in this embodiment) of the battery unit 1.

Figure 5:
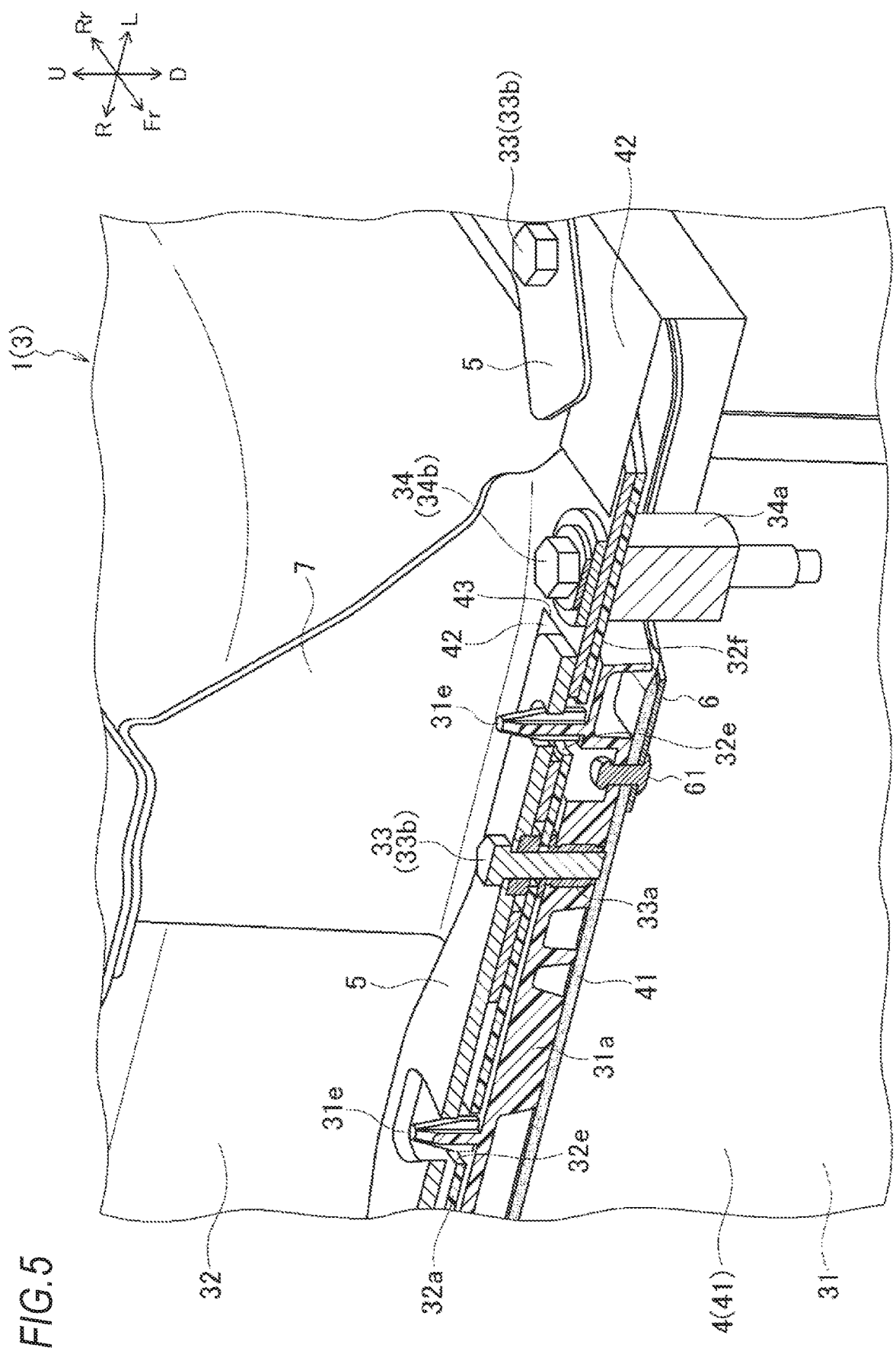
FIG. 5 is a cross-sectional view taken along line Y-Y of FIG. 4.

The flange portion 31a of the case body 31 and the flange portion 32a of the lid 32 overlap with each other and are fastened via a plurality of fastening members 33. As illustrated in FIG. 5, the fastening member 33 of the embodiment is a bolt 33b. The fastening member 33 passes through the flange portion 32a of the lid 32 and is fastened to an insert nut 33a embedded in the flange portion 31a of the case body 31.

A positioning pin 31e extending toward the flange portion 32a of the lid 32 is provided in the flange portion 31a of the case body 31. The positioning pin 31e is inserted into a positioning hole 32e formed in the flange portion 32a of the lid 32, so that the flange portion 31a of the case body 31 and the flange portion 32a of the lid 32 are positioned.

The flange portion 32a of the lid 32 includes a plurality of vehicle fastening portions 32f to be fastened to the vehicle skeleton member CM, and the plurality of vehicle fastening portions 32f are fixed to the vehicle skeleton member CM via a fixing member 34 passing through the vehicle fastening portion 32f. As illustrated in FIG. 5, the fixing member 34 of the embodiment is a bolt 34b. The fixing member 34 passes through the vehicle fastening portion 32f, a collar 34a interposed between the vehicle fastening portion 32f and the vehicle skeleton member CM, and the vehicle skeleton member CM to be fastened to a nut 34c attached to the vehicle skeleton member CM. Therefore, the battery unit 1 is fastened to the vehicle skeleton member CM in a state where the battery unit 1 is accommodated in the battery unit accommodation portion H.

The lid 32 is arranged above the floor panel FP by fastening the vehicle fastening portion 32f to the vehicle skeleton member CM, and the case body 31 is arranged below (outside the cabin) the floor panel FP. For this reason, countermeasures against combustion of the case body 31 of the case 3 which is susceptible to heat are necessary when fire reaches the surroundings thereof during a vehicle fire or the like. Also, gaps are likely to be generated because the two members are overlapped. Therefore, it is preferable to apply countermeasures against combustion to a boundary portion between the flange portion 31a of the case body 31 and the flange portion 32a of the lid 32.

[Incombustible Member]

The incombustible member 4 is made of an incombustible metal sheet containing a glass material and is, for example, an aluminum pouch made of an aluminum sheet containing glass wool, whereby the incombustible member 4 is lightweight but has necessary incombustibility and moderate flexibility. Further, the incombustible member 4 of the embodiment includes a glass material accommodation portion 41 accommodating a glass material and a sheet joint portion 42 which surrounds the glass material accommodation portion 41 and in which incombustible metal sheets are joined (adhered or welded) to each other.

The sheet joint portion 42 is provided so as to surround the outer peripheral portion of the glass material accommodation portion 41 in order to prevent exposure and scattering of the glass material. However, it may be provided at a position other than the outer peripheral portion of the glass material accommodation portion 41 in order to prevent bias of the glass material in the glass material accommodation portion 41.

As illustrated in FIGS. 4 to 7, the incombustible member 4 covers the flange portion 31a of the case body 31, the flange portion 32a of the lid 32, and the case body 31. On the other hand, the incombustible member 4 does not cover the part of the lid 32 excluding the flange portion 32a More specifically, the incombustible member 4 is provided not only to cover a lower surface of the bottom portion 31b of the case body 31, outer side surfaces of the front, rear, left, and right side walls 31c of the case body 31, and a lower surface of the flange portion 31a of the case body 31 but also to wrap around to an upper surface of the flange portion 32a of the lid 32. Therefore, it is possible to prevent combustion of the case body 31 regardless of a material forming the case body 31.

The incombustible member 4 includes a notch portion 43 cut out in a U shape so as to avoid the vehicle fastening portion 32f of the flange portion 32a. As a result, the fixing member 34 fixing the vehicle fastening portion 32f of the flange portion 32a and the vehicle skeleton member CM passes through the notch portion 43, so that it is avoided that holes are generated in the incombustible member 4. The sheet joint portion 42 is formed around the notch portion 43 in order to prevent exposure and scattering of the glass material.

The incombustible member 4 covers the upper surface of the flange portion 32a of the lid 32 with the sheet joint portion 42. Therefore, the fastening member 33 fastening the flange portion 31a of the case body 31 and the flange portion 32a of the lid 32 and the positioning pin 31e extending from the flange portion 31a of the case body 31 to the flange portion 32a of the lid 32 pass through the sheet joint portion 42. This prevents the fastening member 33 and the positioning pin 31e from passing through the glass material accommodation portion 41, and thus the glass material can be prevented from scattering from the penetration portion. Further, it is possible to avoid providing the notch portion 43 in a portion through which the fastening member 33 and the positioning pin 31e pass, and thus it is possible to simplify, the structure of the incombustible member 4 and to easily perform positioning between the incombustible member 4 and the case 3.

It is preferable that a boundary portion between the flange portion 31a of the case body 31 and the flange portion 32a of the lid 32 be covered with the glass material accommodation portion 41 of the incombustible member 4. In this way, it is possible to reduce the possibility of fire or heat entering the case 3 from the boundary portion, as compared with a case where the boundary portion is covered with the sheet joint portion 42.

[Upper Reinforcing Plate]

Figure 4:
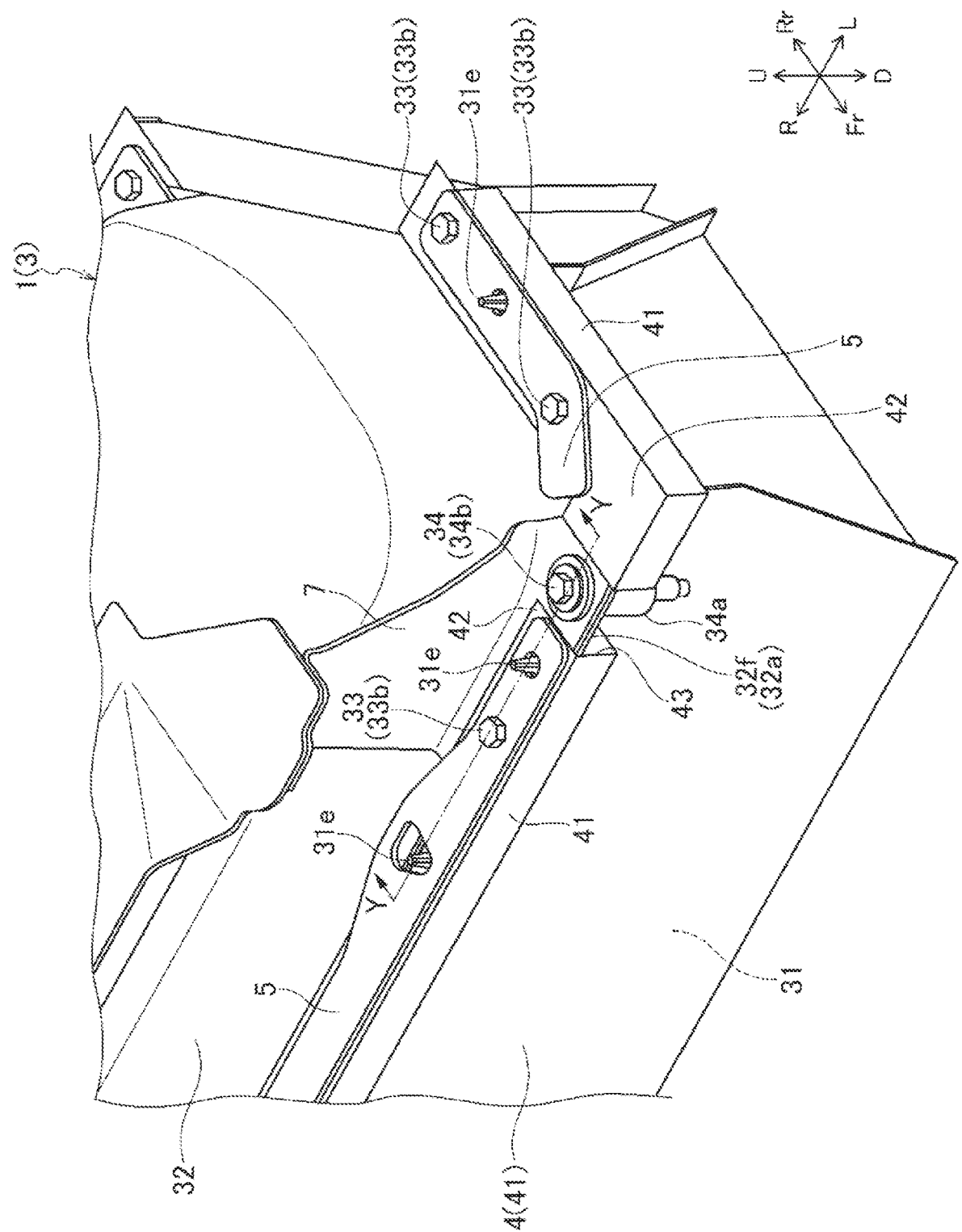
FIG. 4 is a perspective view of a main part of the battery unit of FIG. 1 as seen from above.

As illustrated in FIGS. 4 and 5, an upper reinforcing plate 5 having a plate shape is arranged on an upper surface of the flange portion 32a of the lid 32. The upper reinforcing plate 5 pinches the sheet joint portion 42 of the incombustible member 4 disposed on the upper surface of the flange portion 32a of the lid 32 with the flange portion 32a of the lid 32, so that the positional shift of the incombustible member 4 is regulated. In particular, the upper reinforcing plate 5 of the embodiment holds the incombustible member 4 around the vehicle fastening portion 32f, and thus it is possible to effectively prevent the incombustible member 4 from getting caught in the fixing member 34 and being damaged. A member denoted by reference numeral 7 in FIGS. 4 and 5 is a rigid plate interposed between the upper reinforcing plate 5 and the flange portion 32a of the lid 32 and reinforces the vehicle fastening portion 32f. However, the member is not absolutely necessary and may be omitted.

The upper reinforcing plate 5 of the embodiment is fixed to the flange portion 32a of the lid 32 in a joint fastened state using the fastening member 33 which fastens the flange portion 31a of the case body 31 and the flange portion 32a of the lid 32. In addition, the fastening member 33 and the upper reinforcing plate 5 are made of metal, and thus the effect of countermeasures against combustion does not deteriorate unlike a case of being made of resin.

[Lower Reinforcing Plate]

Figure 6:
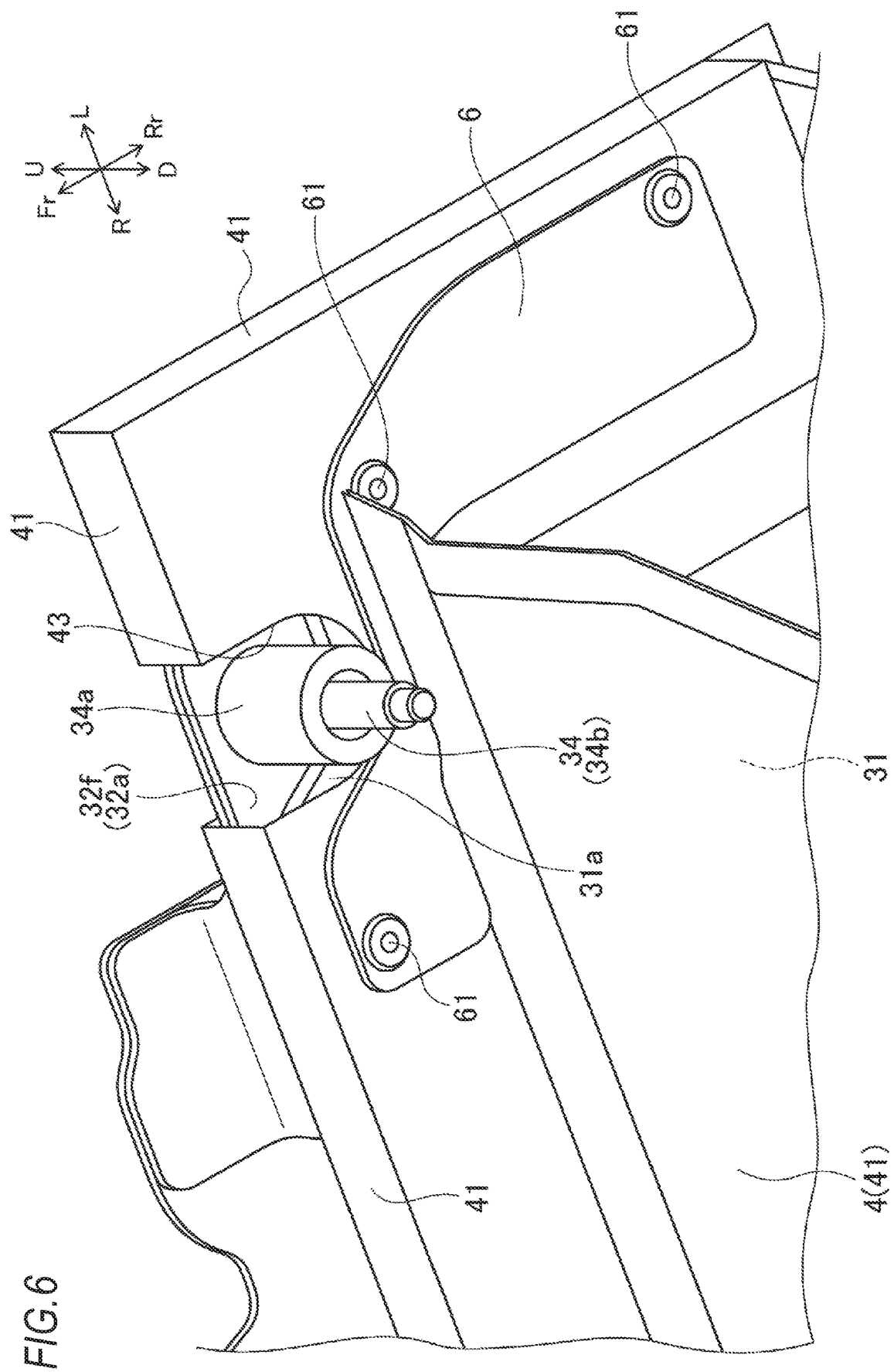
FIG. 6 is a perspective view of a main part of the battery unit of FIG. 1 as seen from below.
Figure 7:
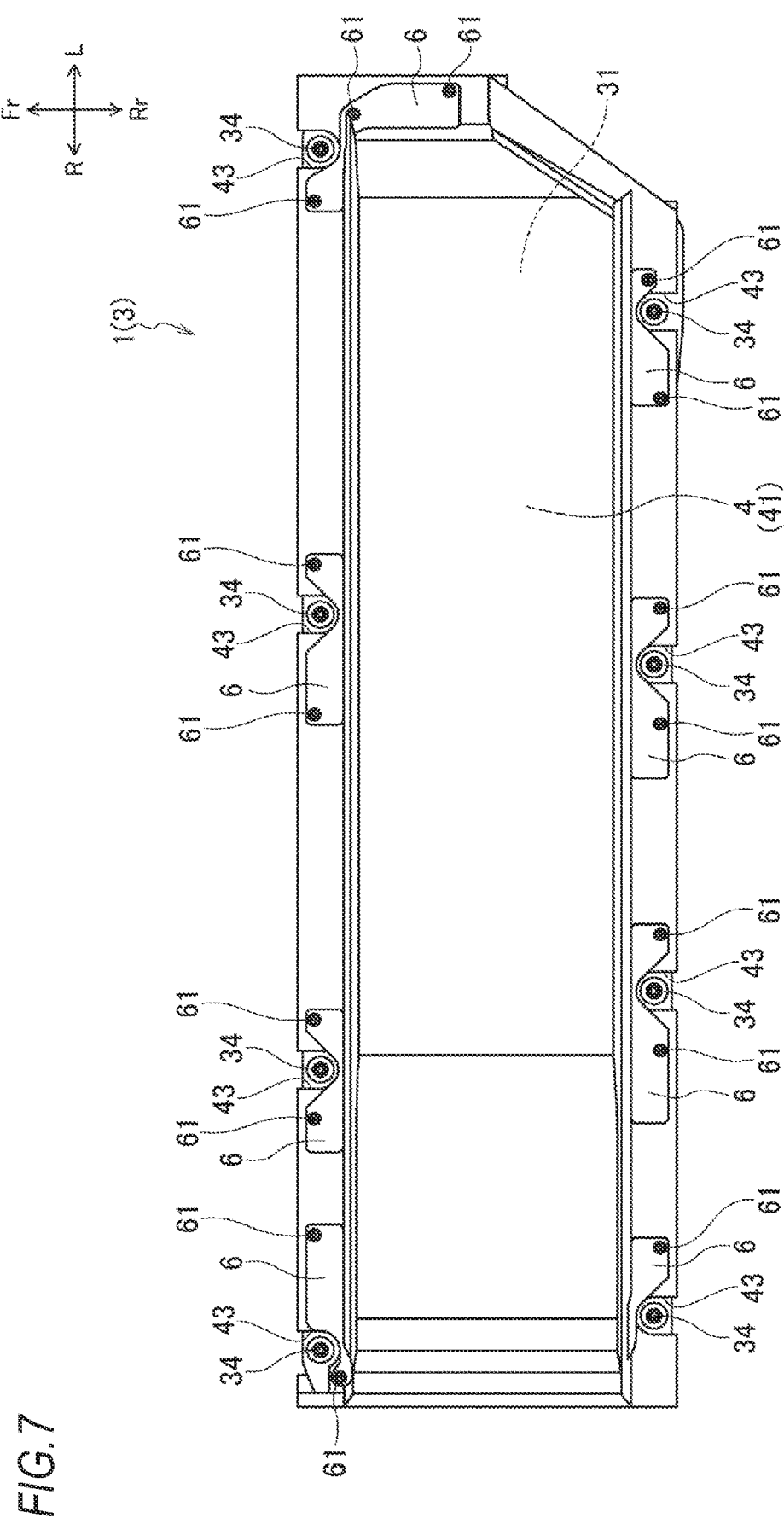
FIG. 7 is a bottom view of the battery unit of FIG. 1.

As illustrated in FIGS. 5 to 7, a lower reinforcing plate 6 having a plate shape is disposed on a lower surface of the flange portion 31a of the case body 31. The lower reinforcing plate 6 pinches the glass material accommodation portion 41 of the incombustible member 4 disposed on the lower surface of the flange portion 31a of the case body 31 with the flange portion 31a of the case body 31, so that the positional shift of the incombustible member 4 is regulated. In particular, the lower reinforcing plate 6 of the embodiment holds the incombustible member 4 around the vehicle fastening portion 32f, and thus it is possible to effectively prevent the incombustible member 4 from getting caught in the fixing member 34 and being damaged.

The lower reinforcing plate 6 of the embodiment is fastened to the flange portion 31a of the case body 31 by using a rivet 61. In this case, the rivet 61 passes through the glass material accommodation portion 41 of the incombustible member 4, but a rivet hole of the lower reinforcing plate 6 is blocked with the rivet 61, so that the glass material is prevented from being scattered from the rivet hole of the lower reinforcing plate 6. In addition, the rivet 61 and the lower reinforcing plate 6 are made of metal, so that the effect of countermeasures against combustion does not deteriorate unlike a case of being made of resin.

SUMMARY

From the embodiment described above, the following aspects are extracted.

Although the corresponding elements in the embodiment described above are shown in parentheses, it is not limited thereto.

(1) A battery unit (battery unit 1) including a battery (battery 2), and a case (case 3) accommodating the battery, wherein the case includes:

a case body (case body 31) including:

a bottom portion (bottom portion 31b); and a side wall (side wall 31c), which is erected from the bottom portion and defines an opening portion; and a lid (lid 32) covering the opening portion of the case body, the case body and the lid are fastened at flange portions thereof (flange portion 31a and flange portion 32a), and the flange portion of the case body, the flange portion of the lid, and the case body are covered with an incombustible member (incombustible member 4) containing a glass material.

According to (1), the flange portion of the case body, the flange portion of the lid, and the case body constituting the case are covered with the incombustible member containing a glass material, and thus combustion of the case body can be prevented regardless of a material forming the case body. Therefore, by forming the case body with a material (for example, resin) which is lightweight as compared with a metal or the like, both countermeasures against combustion and weight reduction can be achieved.

(2) The battery unit according to (1) described above, wherein in the case, at least one of the flange portion of the case body and the flange portion of the lid includes a vehicle fastening portion (vehicle fastening portion 321) to be fastened to a vehicle skeleton member (vehicle skeleton member CM), the incombustible member includes a notch portion (notch portion 43) which avoids the vehicle fastening portion, and a fixing member (fixing member 34) fixing the vehicle fastening portion and the vehicle skeleton member passes through the notch portion.

According to (2), since the incombustible member includes the notch portion which avoids the vehicle fastening portion of the flange portion, and the fixing member fixing the vehicle fastening portion and the vehicle skeleton member passes through the notch portion, it is possible to prevent a hole from being generated in the incombustible member by the fixing member.

(3) The battery unit according to (1) or (2) described above, wherein the incombustible member is made of an incombustible metal sheet containing a glass material.

According to (3), since the incombustible member is made of an incombustible metal sheet containing a glass material, both incombustibility and weight reduction can be achieved.

(4) The battery unit according to (3) described above, wherein the incombustible member includes:

a glass material accommodation portion (glass material accommodation portion 41) which accommodates the glass material; and a sheet joint portion (sheet joint portion 42) which surrounds the glass material accommodation portion and in which the incombustible metal sheets are joined to each other, an upper surface of the flange portion of the lid is covered with the sheet joint portion, and a fastening member (fastening member 33) fastening the flange portion of the case body and the flange portion of the lid passes through the sheet joint portion and does not pass through the glass material accommodation portion.

According to (4), since the fastening member fastening the flange portion of the case body and the flange portion of the lid passes through the sheet joint portion of the incombustible member and does not pass through the glass material accommodation portion, it is possible to prevent the glass material from scattering due to a hole generated in the glass material accommodation portion.

(5) The battery unit according to (4) described above, wherein an upper reinforcing plate (upper reinforcing plate 5) having a plate shape is arranged on the upper surface of the flange portion of the lid, and the sheet joint portion disposed on the upper surface of the flange portion of the lid is pinched between the flange portion of the lid and the upper reinforcing plate.

According to (5), since the sheet joint portion of the incombustible member disposed on the upper surface of the flange portion of the lid is pinched between the flange portion of the lid and the upper reinforcing plate, the positional shift of the incombustible member can be prevented.

(6) The battery unit according to (4) or (5) described above, wherein a boundary portion between the flange portion of the case body and the flange portion of the lid is covered with the glass material accommodation portion.

According to (6), since the boundary portion between the flange portion of the case body and the flange portion of the lid is covered with the glass material accommodation portion of the incombustible member, it is also possible to prevent infiltration of fire or heat from the boundary portion into the case.

(7) The battery unit according to any one of (4) to (6) described above, wherein a positioning pin (positioning pin 31*e*) extending toward the flange portion of the lid is provided in the flange portion of the case body, and the positioning pin passes through the sheet joint portion and does not pass through the glass material accommodation portion.

According to (7), the positioning pin extending toward the flange portion of the lid is provided in the flange portion of the case body, and the positioning pin passes through the sheet joint portion of the incombustible member and does not pass through the glass material accommodation portion. Therefore, it is possible to prevent the glass material from scattering due to a hole generated in the glass material accommodation portion.

(8) The battery unit according to any one of (1) to (7) described above, wherein the incombustible member is an aluminum pouch made of an aluminum sheet containing glass wool.

According to (8), since the incombustible member is an aluminum pouch made of an aluminum sheet containing glass wool, it is possible to have moderate flexibility while both incombustibility and weight reduction are achieved.

The invention is not limited to the embodiment described above and a modification example, and modifications, improvements, and the like can be made as appropriate.

For example, in the embodiment described above, the vehicle fastening portion 32*f* is provided in the flange portion 32*a* of the lid 32. However, the vehicle fastening portion 32*f* may be provided in the flange portion 31*a* of the case body 31 or may be provided in the flange portion 32*a* of the lid 32 and the flange portion 31*a* of the case body 31.

The invention claimed is:

1. A battery unit comprising a battery, and a case accommodating the battery, wherein the case includes:
    a case body including:
        a bottom portion; and
        a side wall, which is erected from the bottom portion and defines an opening portion; and
    a lid covering the opening portion of the case body,
    the case body and the lid are fastened at flange portions thereof,
    the flange portion of the case body, the flange portion of the lid, and the case body are covered with an incombustible member containing a glass material,
    the incombustible member is made of an incombustible metal sheet containing a glass material,
    the incombustible member includes:
        a glass material accommodation portion which accommodates the glass material; and
        a sheet joint portion which surrounds the glass material accommodation portion and in which the incombustible metal sheets are joined to each other,
    an upper surface of the flange portion of the lid is covered with the sheet joint portion, and
    a fastening member fastening the flange portion of the case body and the flange portion of the lid passes through the sheet joint portion and does not pass through the glass material accommodation portion.

2. The battery unit according to claim 1, wherein in the case, at least one of the flange portion of the case body and the flange portion of the lid includes a vehicle fastening portion to be fastened to a vehicle skeleton member, the incombustible member includes a notch portion which avoids the vehicle fastening portion, and a fixing member fixing the vehicle fastening portion and the vehicle skeleton member passes through the notch portion.

3. The battery unit according to claim 1, wherein an upper reinforcing plate having a plate shape is arranged on the upper surface of the flange portion of the lid, and the sheet joint portion disposed on the upper surface of the flange portion of the lid is pinched between the flange portion of the lid and the upper reinforcing plate.

4. The battery unit according to claim 1, wherein a boundary portion between the flange portion of the case body and the flange portion of the lid is covered with the glass material accommodation portion.

5. The battery unit according to claim 1, wherein a positioning pin extending toward the flange portion of the lid is provided in the flange portion of the case body, and the positioning pin passes through the sheet joint portion and does not pass through the glass material accommodation portion.

6. The battery unit according to claim 1, wherein the incombustible member is an aluminum pouch made of an aluminum sheet containing glass wool.

\* \* \* \* \*